Figure 1:
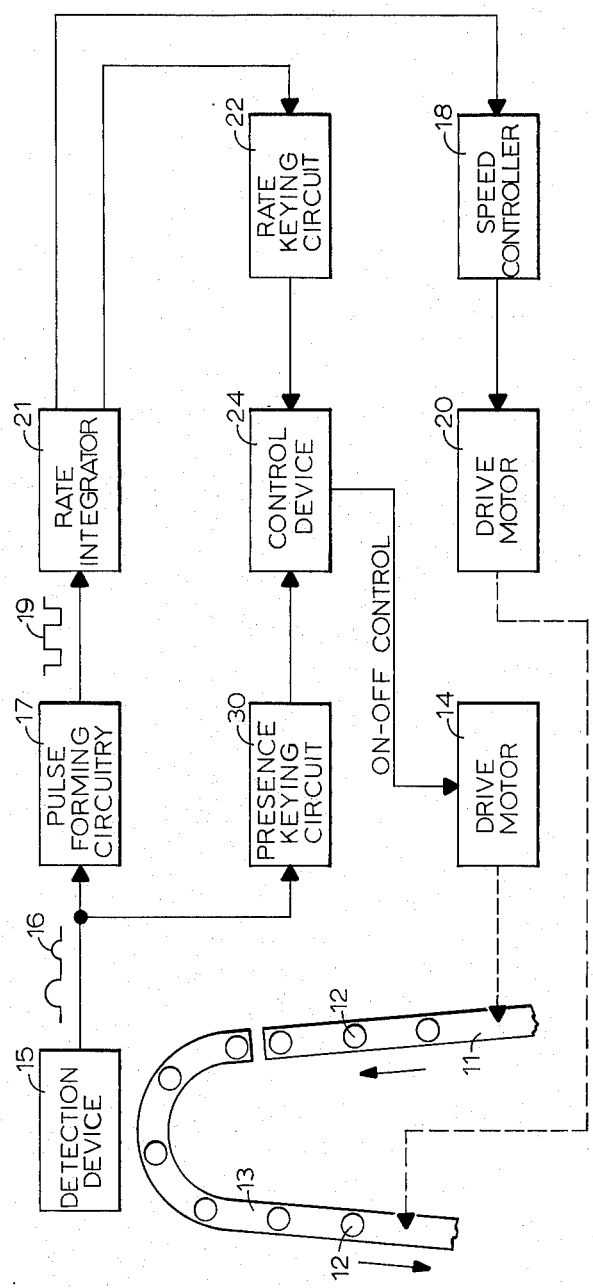

INVENTORS
RAMEY B. METZ
STANLEY M. KERBER
BY Edward A. Sokolski
ATTORNEY

United States Patent Office 3,200,932
Patented Aug. 17, 1965

3,200,932
MOTION CONTROL SYSTEM
Ramey B. Metz, Anaheim, and Stanley M. Kerber, Fullerton, Calif., assignors to Tamar Electronics Industries, Inc., Anaheim, Calif., a corporation of Delaware
Filed Apr. 14, 1964, Ser. No. 359,801
16 Claims. (Cl. 198—37)

This invention relates to a motion control system and more particularly to such a system suitable for controlling the movement of objects on a conveyor belt.

Conveyor belt systems are utilized extensively in manufacturing, processing, and packaging to bring objects to various positions where particular operations are performed.

In such systems, automatic controls are generally provided to shut down the conveyor should a situation arise which indicates an undesirable flow condition such as, for example, might be caused by a jam on the line. Prior art control devices for achieving such operation generally rely on information as to the presence or absence of objects, the existence or nonexistence of motion of such objects, and the spacing between such objects. In view of the lack of information as to the actual rate of movement of the objects provided in such devices, a shutdown may occur in a situation where such action is not required. In many such systems, two or more sensors positioned at different points along the line, each operating in conjunction with separate circuitry are generally required to accomplish proper control action. Further, in most such systems, no continuous, proportional servo control to regulate the flow rate is provided.

The device of this invention overcomes the shortcomings of prior art motion control devices in providing a relatively simple yet highly accurate system which operates in response both to a signal in accordance with the presence time of objects and a signal in accordance with the rate of movement of such objects. These signals are developed from the output of a single sensor thereby making for greater economy and simplicity. The rate signal generated is proportional to the actual rate of movement of the objects on the line and can be utilized, if desired, not only for "on-off" control in conjunction with the presence signal but also for proportional servo control to continually regulate the rate of flow. The use of a signal in accordance with the actually measured rate of flow of objects as a control criterion in conjunction with the presence signal assures more reliable operation of the "on-off" control.

The device of the invention operates in conjunction with a detection device which generates a pulse output each time an object passes by it along the conveyor line. These pulses are formed by means of pulse forming circuitry so that they all have equal amplitude and time duration. The formed pulses are integrated and a signal in accordance with the rate of flow of objects along the conveyor is thereby produced. This signal, if so desired, may be utilized to control the speed of the drive motor for one of the conveyor belts so that the rate of flow of objects along the line tends to remain constant. The integrated output is also fed to a rate keying circuit for keying a control device which is capable of turning the drive motor for a feed belt on and off. This control device additionally receives a signal from a presence keying circuit which is responsive to the detection device. If signals are simultaneously received by the motor control device from the rate keying circuit which indicate that the motion of objects along the line has dropped below a minimum predetermined speed, and from the presence keying circuit which indicate that there are objects before the detector for greater than a predetermined time period, the drive motor for the feed belt is automatically shut down by the control device. Thus, dual criteria are established for shutting down the conveyor line so that, for example, the lack of a high enough rate signal in itself will not cause the line to shut down unless the presence keying circuit simultaneously has an output indicating that objects are appearing before the detector for at least a predetermined minimum time. Similarly, an output from the presence keying circuit indicating an abnormal presence condition will not cause the line to shut down unless the rate signal simultaneously indicates too low a rate of movement. Various types of operation can be achieved in response to these dual criteria, as application requirements may dictate.

It is therefore an object of this invention to provide an improved motion control system.

It is another object of this invention to provide a motion control system in which control is provided in response to both the detected presence or absence of objects and the rate of movement of such objects.

It is a further object of this invention to provide an accurate motion control system of simpler and more economical fabrication than prior art devices.

It is still another object of this invention to provide a motion control system in which proportional speed control and "on-off" motion control are combined in the same circuitry.

It is still a further object of this invention to provide an accurate motion control system in which only a single object sensor is required.

It is still another object of this invention to provide a motion control system having improved reliability over similar prior art devices.

Figure 2:
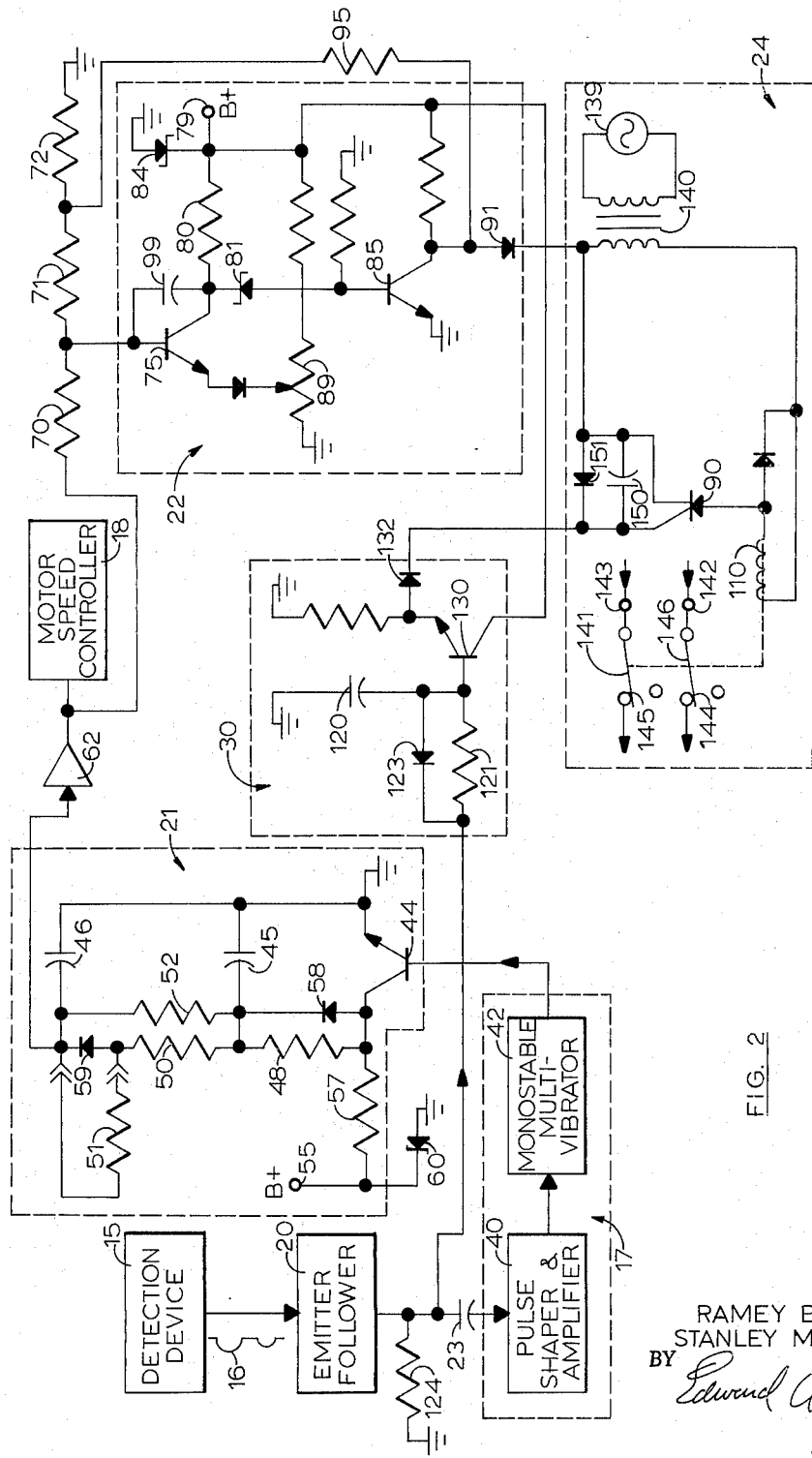

Other objects of this invention will become apparent from the following description taken in connection with the accompany drawings, of which:

FIG. 1 is a block diagram illustrating the basic operation of the device of the invention, and FIG. 2 is a schematic drawing illustrating a preferred embodiment of the device of the invention.

Referring now to FIG. 1, a block diagram illustrating the basic operation of the device of the invention is shown. Conveyor feed belt 11, which is driven by drive motor 14 conveys objects 12 onto conveyor belt 13. Belt 13 is driven by drive motor 20 and conveys objects past detection device 15. Each time an object 12, which may be a can or a bottle, passes the detection device, an output pulse 16 is generated thereby. Detection device 15 may comprise any suitable sensor capable of producing an output pulse when an object 12 passes by and a steady signal when an object is stationary before it.

Pulses 16 which generally have a varying amplitude and pulse width are fed to pulse forming circuitry 17. Pulse forming circuitry 17 as to be explained in connection with FIG. 2, may include circuits for shaping the pulses to form trigger signals which in turn drive a mono-stable multivibrator. This results in output pulses 19 having a uniform pulse width and amplitude and which appear at a rate which is in accordance with the rate of arrival of pulses 16 from detection device 15.

Pulses 19 are integrated in rate integrator 21, the output of which is a voltage directly proportional to the pulse rate of pulses 16 and therefore the speed of motion of objects 12 on conveyor belt 11. The output from rate integrator 21 which increases in magnitude as the rate of pulses 19 increases and vice-versa, is fed as a control signal to speed controller 18. Speed controller 18 controls the speed of drive motor 20. By techniques well known in the art, the motor speed controller is made to decrease the speed of the motor with inceases in the magnitude of the control signal and vice versa. Thus, if the rate of pulses 16 should increase, indicating an increase in the speed of flow of objects 12 past detection device 15, the speed of drive motor 20 will be decreased, and if the rate of pulses 16 should decrease, the speed of the motor will be increased, thereby tending to maintain the rate of flow of the objects constant.

A second output from rate integrator 21 which is proportional to the rate of pulses 19 is fed to rate keying circuit 22. Rate keying circuit 22 is adjustable so that it can be set to respond to any predetermined minimum or greater output from rate integrator 21. When the rate of pulses 19 exceeds this predetermined minimum value as reflected by the signal fed from rate integrator 21 to the keying circuit, a control signal is fed from keying circuit 22 to control device 24 which keys this control device to the "off" condition.

Output pulses 16 are also fed to presence keying circuit 30 which provides a keying signal to control device 24 when the integrated signal output of these pulses, which is a function of the width, magnitude, and pulse rate thereof exceeds a predetermined magnitude. When one of objects 12 is before detection device 15 for a period of time greater than a predetermined period, the output of presence keying circuit 30 will be such as to cause control device 24 to go to the "off" condition provided the output of rate keying circuit 22 is simultaneously such as to indicate a rate flow below the predetermined minimum. Control device 24 is connected to control drive motor 14 and shuts this motor off when it is in the "off" condition. Control device 24 may also be used to produce a warning signal such as a light or buzzer alarm when it is in the "off" condition.

Thus, control device 24 operates as a gating control to turn off drive motor 14 and stop conveyor belt 11 when flow stoppage or a jammed condition is indicated by the output of keying circuit 30 and a below minimum rate of flow is simultaneously indicated by the output of keying circuit 22. It is to be noted that such operation in response to the conditions of both flow rate and the detected presence or absence of objects assures that the line will not be shut down when there are voids in the line which, of course would result in there being zero output from the rate integrator. The system can thus distinguish between this situation and the situation where the flow is stopped which also results in no rate output. So also, if the objects are passing the sensor with little or no spacing therebetween which might produce a signal indicating continual presence, the rate signal produced by the movement of such objects will prevent a line shutdown. It is to be noted that a satisfactory rate signal can be generated with little or no spacing between successive objects as long as there are some breaks formed therebetween which can be sensed by the detector such as, for example the breaks or indentations formed in a line of abutting round objects.

Referring now to FIG. 2, a schematic diagram of a preferred embodiment of the device of the invention is shown. Detection device 15, which as already noted may comprise a capacitive sensor, produces a varying amplitude signal in the form of an output pulse 16 each time an object passes by it or a steady state D.C. if an object remains stationary within its detection range. The output detection device 15 is fed to emitter follower 20. Emitter follower 20 is directly coupled to detection device 15 so the D.C. as well as A.C. signal components are fed thereto. The A.C. signal output components are coupled from emitter follower 20 through capacitor 23 to pulse shaper and amplifier 40. Pulse shaper and amplifier 40 may comprise conventional amplifier stages having resistive-capacitive pulse shaping networks to produce sharp trigger pulses in accordance with the leading edges of the pulses received from emitter follower 20.

The output of pulse shaper and amplifier 40 is fed to monostable multivibrator 42. Monostable multivibrator 42 which may be of the Schmitt trigger variety develops output pulses having uniform amplitude and pulse width at a rate which is in accordance with the rate of arrival of signal voltage pulses 16.

The output of monostable multivibrator 42 is fed to rate integrator circuit 21 which generates a D.C. voltage having a magnitude in accordance with the rate of the pulse output of the multivibrator. The output stage of multivibrator 42 is conducting when the multivibrator is in its stable state. With the multivibrator in its stable state, a signal is fed to the base of transistor 44 which maintains this transistor in a conductive state. Under such conditions, a discharge path is provided for capacitor 45 through resistor 48 and the transistor to ground Capacitor 46 is also discharged through the resistive network including resistors 50, 51, 52 and 48 and transistor 44 to ground. Thus, in the absence of any pulse input to multivibrator 42, both capacitors 45 and 46 remain substantially discharged.

When a pulse is received by monostable multivibrator 42 from pulse shaper and amplifier 40, the output stage of monostable multivibrator 42 is cut off for a precise time interval as determined by the time constant characteristics of the multivibrator. For this precise time interval, transistor 44 is also driven to cut off. With transistor 44 at cut-off, capacitor 45 is charged by virtue of current flow from terminal 55 through resistor 57 and diode 58. The voltage at terminal 55 is precisely regulated by means of zener diode 60 to assure that the charge on capacitor 45 will be the same for each pulse received from the multivibrator. Capacitor 46 is also charged through resistors 57, 50 and diodes 58 and 59. Capacitor 46 further integrates the voltage across capacitor 45.

The use of second integrating capacitor 46 in the output of rate integrator 21 prevents a single spurious transient pulse, which might be introduced into the system from a relay contact or the like, from erroneously causing the actuation of keying circuit 22. Resistor 52 has a relatively high resistance as compared with resistor 50 and does not substantially alter the charge path.

Resistors 48 and 57 are equal in value, and therefore the average voltage on capacitor 45 is directly proportional to the ratio between the time that transistor 44 is cut off to the time this transistor is conducting. In view of the uniform time duration of the pulse output of monostable multivibrator 42 for each input pulse received, the time transistor 44 is cut off is the same for each such input pulse. The time that the transistor is conducting is the time interval between input pulses and is therefore inversely proportional to the pulse rate. Thus, the average D.C. voltages across capacitors 45 and 46 are proportional to the rate of arrival of pulses 16.

The discharge path for capacitor 46 includes resistors 48, 50, 51 and 52, resistor 51 being a plug-in unit. As the discharge time constant of this circuit determines the delay in the operation of the circuit, resistor 51 can be selected to change this time delay as desired to meet various application requirements for the operation of control device 24.

The D.C. output of rate integrator 21 is fed to power amplifier 62 where it is appropriately amplified. The output of power amplifier 62 is available for use with a motor speed controller 18 which may be used to control the speed of the drive motor for an appropriate one of the conveyor belts. The output of power amplifier 62 is designed to operate a speed controller so that when the output of the rate integrator increases, the speed of the motor will decrease and vice versa. In effect, this provides negative feedback servo operation which tends to maintain the rate of flow of objects on the conveyor belt constant.

It must be realized however, that such control is limited by the capabilities of the system and depends upon a fairly uniform supply of objects onto the conveyor belt. To prevent jam-ups and other undesirable conditions in the operation of the system, control device 24 is utilized to shut down the motor or actuate other devices such as warning buzzers or lights should such conditions arise as indicated by the outputs of rate keying circuit 22 and integrator 30. Thus, both proportional servo control and on-off control are provided. As the situation may demand, one or the other of these controls may be used separately, or they may be used in combination as shown in FIG. 2.

Amplifier 62 is a D.C. coupled amplifier and the direct current output thereof is divided across the voltage divider comprising resistors 70-72. The voltage between resistors 70 and 71 is fed to the base of transistor 75. With little or no voltage being fed to the base of transistor 75, this transistor is non-conductive. When transistor 75 is in a non-conductive state, the B+ voltage at terminal 79 is fed through resistor 80 across zener diode 81 causing this zener diode to switch to its conductive state. This provides a positive voltage to the base of transistor 85 which is sufficient to drive this transistor into saturated conduction. The positive voltage at the junction between resistors 70 and 71 which will cause transistor 75 to switch to its conductive state is determined by the setting of potentiometer 89. As the voltage appearing between resistors 70 and 71 is directly proportional to the rate of movement of objects on the conveyor belt, potentiometer 89 is thus utilized to determine the rate of movement at which transistor 75 will be switched to its conductive state.

Let us assume that potentiometer 89 is set to a position so that the voltage at the junction of resistors 70 and 71 is sufficient to cause transistor 75 to conduct. With transistor 75 conducting, the voltage at its collector drops to a point below the zener breakdown voltage of zener diode 81. Under such conditions, the positive firing voltage is removed from the base of transistor 85. This transistor therefore goes to cutoff and the voltage on its collector rises which results in a substantial positive voltage being applied to the cathode of silicon controlled rectifier 90 through diode 91. This voltage back biases silicon controlled rectifier 90. To assure sharp firing of transistor 75, a positive feedback signal is fed from the collector of transistor 85 to the base of transistor 75 through resistor 95 to the junction between resistors 71 and 72. This positive feedback signal assures proper firing of transistor 75 and prevents chatter of relay 110. Zener diode 81 by virtue of its sharp breakdown and cutoff characteristics also aids in assuring proper control of transistor 85. Capacitor 99 acts as a filter to smooth out any ripple in the D.C. voltage fed to the base of transistor 75.

Thus, rate keying circuit 22 provides a back biasing voltage to silicon controlled rectifier 90 when the detected rate of flow rate at which such back biasing is applied can be adjusted to a desired value by means of potentiometer 89.

A D.C. voltage indicative of the presence or absence of objects before detection device 15 is fed from emitter follower 20 to presence keying circuit 30. This voltage charges capacitor 120 through resistor 121. A discharge path for capacitor 120 is provided through diode 123 and resistor 124. Capacitor 120 charges to an average value which is a function of the average voltage output of emitter follower 20 and the time constant of the capacitor's charge and discharge circuits. Normally, the time constant of the discharge circuit is made relatively low as compared with the time constant of the charge circuit and capacitor 120 will only have a significant average positive charge when the average voltage output of emitter follower 20 is fairly high as, for example, when objects are stopped before detection device 15 for a period of time. Under such conditions, the voltage applied to the base of transistor 130 will be high enough to cause this transistor to conduct. This results in a positive voltage being applied from the emitter of transistor 130 through diode 132 to the control terminal of silicon controlled rectifier 90. With such a positive voltage fed to the control element of the silicon controlled rectifier and in the absence of a positive blocking voltage being fed to the cathode of rectifier 90 from rate keying circuit 22, the rectifier will be fired to actuate relay 110. Power for energizing relay 110 is supplied by A.C. power source 139, the output of which is coupled to the relay and the silicon controlled rectifier through transformer 140. With silicon controlled rectifier 90 fired, the relay is actuated by the rectified current flowing from transformer 140 through silicon controlled rectifier 90. Capacitor 150 provides protection against false triggering by voltage transients and diode 151 prevents damage to the SCR by limiting the back bias voltage between the control gate and cathode of the SCR.

Relay 110 is thus actuated only when two conditions are satisfied: (1) When the rate of movement of objects is less than a predetermined minimum as determined by rate keying circuit 22 and (2) When objects remain before detection device 15 for greater than a predetermined time period as determined by presence keying circuit 30. Both these conditions must be satisfied simultaneously for the relay to be actuated. Thus, for example, even though objects are so closely spaced on the conveyor belt as to give a high enough average D.C. signal to actuate keying circuit 30, the relay will not be closed unless rate keying circuit 22 has an output indicating that the rate of motion has dropped below the predetermined minimum value.

Contact arms 146 and 141 of relay 110 are utilized to connect power, which is fed to terminals 142 and 143, to terminals 144 and 145 when relay 110 is deactuated. Terminals 144 and 145 are connected to an appropriate drive motor (not shown) to cause it to drive a conveyor belt on the line. When relay 110 is actuated, such power signals are removed from the drive motor and the line is stopped. The relay contacts, of course, could be used in other fashions such as, for example, to actuate a warning light or buzzer to effect the desired control, and the particular type of operation described in connection with FIG. 2 is for illustrative purposes only.

The electrical characteristics of the resistors, diodes, and capacitors utilized in the circuit should be selected so that the relay does not close erroneously under transient conditions. For example, if the line is void of objects, and the relay is open by virtue of the lack of output from keying circuit 30, the relay must be kept open when a group of objects suddenly passes the sensing head. This desired end result is achieved by making the charging time constant of the charging circuits for capacitors 45 and 46 less than that for capacitor 120 so that the movement rate of the objects will produce a positive blocking voltage output from rate keying circuit 22 before a keying transient from presence keying 30 reaches silicon controlled rectifier 90. Similarly, when objects have been passing detection device 15 for some period of time, such that the rate integrator and presence keying circuits are fully charged, the time constant of these circuits must be such that the relay will not be energized should a large gap suddenly appear in front of the detection device. This condition is satisfied if the time constant of the discharge circuit for capacitor 120 is made sufficiently less than the discharge time constant for capacitor 46.

The following is a list showing the values of some of the more significant components utilized in an operative model of the device of the invention:

| | | |
|---|---|---|
| Resistors 57 and 48 | kilohms | 10 |
| Resistor 52 | megohm | 1 |
| Resistor 70 | kilohms | 43 |
| Resistors 50, 71 and 124 | do | 4.7 |
| Resistor 72 | do | 1.5 |
| Resistor 95 | do | 15 |
| Resistor 80 | do | 22 |
| Resistor 121 | do | 100 |
| Potentiometer 89 | do | 5 |
| Capacitors 45 and 46 | mfd | 10 |
| Capacitors 23 and 99 | mfd | 2 |

| | |
|---|---|
| Capacitor 120 | mfd 25 |
| Transistor 44 | Type 2N699 |
| Transistors 75 and 85 | Type 2N706 |
| Silicon controlled rectifier 90 | Type 2N2322 |

The device of the invention thus provides a relatively simple yet highly effective and reliable control circuit for controlling the rate of flow of objects on a conveyor belt. Proportional speed control is provided in addition to "on-off" control which automatically shuts down the line or provides an appropriate alarm signal when such action is called for. The "on-off" control is operated in response to two conditions, namely the detected presence or absence of objects and the rate of flow of objects. The line is only shut down when the outputs indicating both these conditions are such as to clearly indicate that operation is not proper. Either the "on-off" or proportional control outputs can be separately used or they may be utilized in conjunction with each other, as application requirements may dictate.

While the device of the invention has been described and illustrated in detail, it is to be clearly understood that this is intended by way of illustration and example only and is not to be taken by way of limitation, the spirit and scope of this invention being limited only by the terms of the following claims.

We claim:

1. A motion control system for controlling the motion of objects on a conveyor line comprising
   means for detecting the presence of said objects at a predetermined point along said line,
   means responsive to said detecting means for generating a signal in accordance with the rate of movement of said objects,
   means responsive to said detecting means for generating a signal when said objects are before said detecting means for greater than a predetermined period of time,
   means for driving said conveyor line, and
   means responsive to said aforementioned signals for controlling said driving means.

2. The system as recited in claim 1 wherein said means for generating a signal in accordance with the rate of movement of said objects includes an integrator.

3. In a system for controlling the motion of a conveyor line,
   means for detecting objects at a predetermined point along said line,
   integrator means responsive to the output of said detecting means for generating a signal in accordance with the rate of movement of said objects,
   presence keying means responsive to the output of said detecting means for generating a keying signal when said detecting means output exceeds a predetermined average value during a predetermined time interval,
   rate keying means responsive to said integrator means for generating a keying signal when said integrator means output exceeds a predetermined value, and
   means responsive to the outputs of said presence keying means and said rate keying means for controlling the motion of said line.

4. The system as recited in claim 3 wherein said conveyor line includes two motor driven belts and said means for controlling the motion of said line comprises control means responsive to keying signals from said presence keying means and said rate keying means for turning the motor of one of said belts on and off.

5. The system as recited in claim 4 wherein said means for controlling the motion of said line additionally includes speed controller means responsive to the output of said integrator means for controlling the speed of the motor of the other of said belts.

6. A motion control system for controlling the motion of objects on a conveyor line comprising
   means for detecting the presence of said objects at a predetermined point along said line,
   means responsive to said detecting means for generating a signal indicating whether the rate of movement of said objects is above or below a predetermined level,
   means responsive to said detecting means for generating a signal when said objects are before said detecting means for greater than a predetermined period of time, and
   means responsive to said aforementioned signals for generating a control signal when simultaneously the rate of movement of said objects is below said predetermined level and one of said objects is before said detecting means for greater than said predetermined period of time, said control signal being used to stop the movement of said line.

7. In a control system for controlling the motion of a conveyor line said line including a plurality of conveyor belts,
   means for detecting objects at a predetermined point along said line,
   integrator means responsive to the output of said detecting means for generating a signal in accordance with the rate of movement of said objects,
   presence keying means responsive to the output of said detecting means for generating a keying signal when said detecting means output exceeds a predetermined average value for a predetermined minimum time interval,
   rate keying means responsive to said integrator means for generating a keying signal when said integrator means output exceeds a predetermined value,
   means for driving one of said conveyor belts, and
   means responsive to said presence keying means and said rate keying means, for controlling said driving means,
   whereby when said integrator means output is below the predetermined value and said detecting means output exceeds the predetermined average value, said means for controlling said driving means turns said driving means off.

8. In a control system for controlling the motion of a conveyor line said line including a plurality of conveyor belts,
   means for detecting objetcs at a predetermined point along said line,
   integrator means responsive to the output of said detecting means for generating a signal in accordance with the rate of movement of said objects,
   presence keying means responsive to the output of said detecting means for generating a keying signal when said detecting means output exceeds a predetermined average value for a predetermined minimum time interval,
   rate keying means responsive to said integrator means for generating a keying signal when said integrator means output exceeds a predetermined value,
   means for driving one of said conveyor belts, and
   means responsive to said presence keying means and said rate keying means, for generating a control signal for said driving means when said integrator means output is below the predetermined value and said detecting means output exceeds the predetermined average value.

9. A control system for controlling the motion of objects on a conveyor line comprising
   detection means for producing output pulses in accordance with the movement of said objects,
   pulse forming means for converting said output pulses to pulses having uniform amplitude and width and at a rate in accordance with the rate of movement of said objects,
   means for integrating said pulses of uniform width and amplitude,
   means for controlling the rate of motion of said line in response to the output of said integrating means,
   a control device for stopping said conveyor line, first keying means responsive to a predetermined minimum output from said integrator means, and second keying means responsive to a predetermined minimum output of said detection means, said first and second keying means being connected to control said control device, whereby when said integrator means has less than said predetermined minimum output and said detection means has greater than said predetermined minimum output, said first and second keying means cause said control device to stop said conveyor line.

10. The system as recited in claim 9, said conveyor line including two conveyor belts, said means for controlling the rate of motion of said line inluding a motor for driving at least one of said belts and a speed controller for said motor, said speed controller being connected to receive the output of said integrating means.

11. A control system for controlling the motion of objects on a conveyor line including at least two motor driven conveyor belts comprising detection means for producing output pulses in accordance with the movement of said objects, pulse forming means for converting said output pulses to pulses having uniform amplitude and width and at a rate in accordance with the rate of movement of said objects, means for integrating said pulses of uniform width and amplitude, means for coupling the output of said integrating means to one of the belt motors as a speed control signal, control device means for turning the belt motor of the other of said belts on and off, first keying means responsive to a predetermined minimum output from said integrator means, and second keying means responsive to a predetermined minimum output from said detection means, said control device being responsively connected to said first and second keying means to turn off the motor of said other belt when said integrator means has less than the aforesaid predetermined output and said detection means has at least the aforesaid predetermined minimum output.

12. In a motion control system for controlling the motion of objects on a conveyor line, means for detecting the presence or absence of said objects at a predetermined point along said line, means responsive to said detecing means for producing a signal in accordance with the rate of movement of said objects, first keying means responsive to said detecting means for producing an output when said objects are present before said detecting means for more than a predetermined time interval, second keying means responsive to said signal in accordance with the rate of movement of said objects for producing a signal indicative of whether or not the rate of movement is above or below a predetermined value, means for driving at least one portion of said line, and means responsive to the outputs of said first and second keying means for controlling said driving means, whereby when simultaneously the rate of movement of said objects is below said predetermined value and an object is present before said detecting means for more than said predetermined time interval, said means for controlling said driving means stops the movement of at least a portion of said line.

13. The system as recited in claim 12 and further comprising means for driving another portion of said line including said predetermined point, and means responsive to said signal in accordance with rate of movement for controlling the speed of said means for driving another portion of said line.

14. In a motion control system for controlling the motion of objects on a conveyor line, means for detecting the presence or absence of said objects at a predetermined point along said line, means responsive to said detecting means for producing a signal in accordance with the rate of movement of said objects, first keying means responsive to said detecting means for producing an output when said objects are present before said detecting means for more than a predetermined time interval, second keying means responsive to said signal in accordance with rate of movement for producing a signal indicative of whether or not the rate of movement is above or below a predetermined value, and means responsive to the outputs of said first and second keying means for generating a motion control signal when simultaneously the rate of movement of said objects is below said predetermined value and an object is present before said detecting means for more than said predetermined time interval.

15. The system as recited in claim 14 wherein said means for producing a signal in accordance with the rate of movement of said objects includes means for generating pulses having uniform width and amplitude and a rate in accordance with the rate of movement of said objects past said detecting means and resistive-capacitive charging circuit means for producing a D.C. voltage in accordance with the rate of said pulses.

16. The system as recited in claim 15 wherein said resistive-capacitive charging circuit means includes first and second resistive-capacitive charging circuits, said second charging circuit being connected to further integrate the voltage integrated by said first charging circuit.

References Cited by the Examiner

UNITED STATES PATENTS

| | | | |
|---|---|---|---|
| 2,895,888 | 7/59 | Varner | 198—37 X |
| 2,916,792 | 12/59 | Crook et al. | 198—37 X |
| 2,955,206 | 10/60 | Spergel et al. | 198—37 X |

SAMUEL F. COLEMAN, *Primary Examiner.*